April 4, 1950        F. B. HUNTER        2,502,788
INTERCHANGEABLE OPTICAL SYSTEM FOR CAMERAS
Filed June 9, 1947        4 Sheets-Sheet 1

Inventor
Frank B. Hunter,
By
Orl R. Goshaw
Attorney

April 4, 1950        F. B. HUNTER        2,502,788
INTERCHANGEABLE OPTICAL SYSTEM FOR CAMERAS
Filed June 9, 1947        4 Sheets-Sheet 2

Inventor
Frank B. Hunter,
By
Attorney

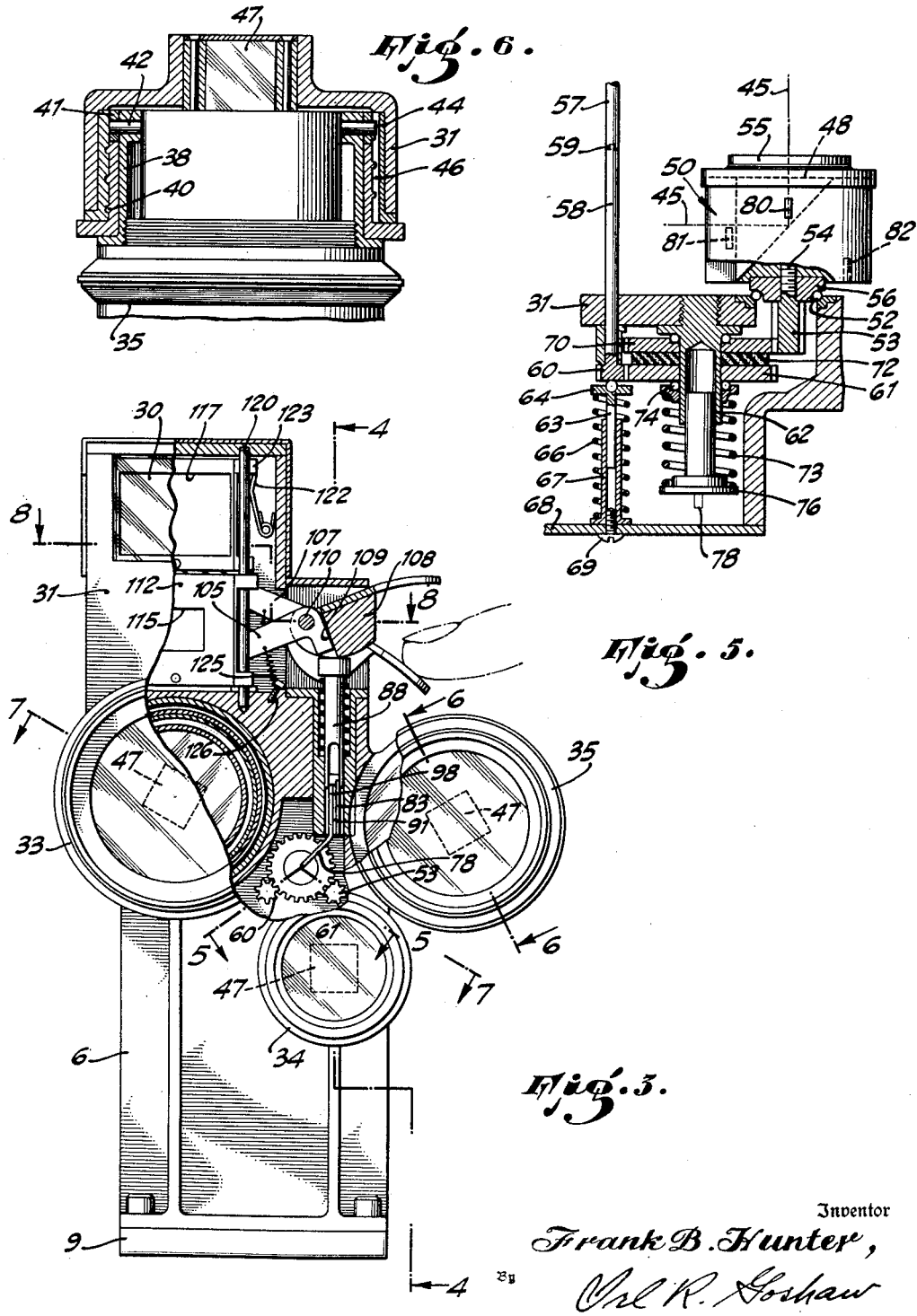

April 4, 1950            F. B. HUNTER            2,502,788

INTERCHANGEABLE OPTICAL SYSTEM FOR CAMERAS

Filed June 9, 1947            4 Sheets-Sheet 4

Inventor
Frank B. Hunter,
By Orl R. Goshaw
Attorney

Patented Apr. 4, 1950

2,502,788

UNITED STATES PATENT OFFICE 2,502,788

INTERCHANGEABLE OPTICAL SYSTEM FOR CAMERAS

Frank B. Hunter, Glendale, Calif., assignor to Thorobred Photo Service, Inc., Los Angeles, Calif., a corporation of California Application June 9, 1947, Serial No. 753,414

17 Claims. (Cl. 88—16)

This invention relates to motion picture apparatus, and particularly to a motion picture camera adjunct to facilitate the interchange of lenses of different focal lengths, although it is also adaptable to any optical system wherein the rapid selection of different optical paths is desired.

In the familiar type of turret camera, two or more lenses are mounted on a plate or disc which may be rotated to position any desired lens in the optical path to the film. To interchange lenses, the entire group of lenses as well as their mounting plate must be rotated as a unit. This materially limits the speed at which lenses may be changed, and prevents the interchange of lenses during the photographing of a scene to provide continuity of action.

The present invention, therefore, is directed to a method of and means for interchanging lenses during the photographing of a scene with motion pictures without losing the continuity of the action in the scene. The change from a lens of one focal length to another may be accomplished in less time than it requires for one frame of 16 mm. film to pass the aperture; namely 1/24 to 1/48 of a second. Should the camera shutter be closed at the time of changeover, the last frame of one lens and the first frame of the next lens will both be in sharp focus. This is accomplished by providing a plurality of lenses fixed with respect to the film or optical axis of the camera and rotating a very small optical element, such as a prism, to shift from one optical path to another. The shift is made more rapidly than is possible by a manual operation, although the shift is triggered manually.

Furthermore, the invention provides a view finder which is simultaneously variable with the exchange of lenses so that the proper field of view is coordinated with the selected lens. The interchange is controlled by a plurality of manually operated levers which control the tripping or the application of power to the rotating element. Power may be obtained directly from a motor or from a rotating shaft in the camera and the amount of rotation to make a complete change from one of the lenses to another is either 120° or 240°.

The principal object of the invention, therefore, is to facilitate the selection of one of a plurality of optical paths in photographic apparatus.

Another object of the invention is to provide an improved system for interchanging lenses during the photographing of a scene.

A further object of the invention is to provide an improved motion picture camera adjunct for rapidly interchanging or selecting lenses and selecting the coordinating view finder.

A still further object of the invention is to provide a motion picture adapter for rapidly interchanging lenses by utilizing the power of the rotating elements in the camera.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 3 is a front view, partially in section, showing the control mechanism of the invention.

Fig. 5 is a cross-sectional view of the drive and clutch mechanism taken along the line 5—5 of Fig. 3.

Fig. 6 is a cross-sectional view of one of the lens mountings taken along the line 6—6 of Fig. 3.

Figure 1:
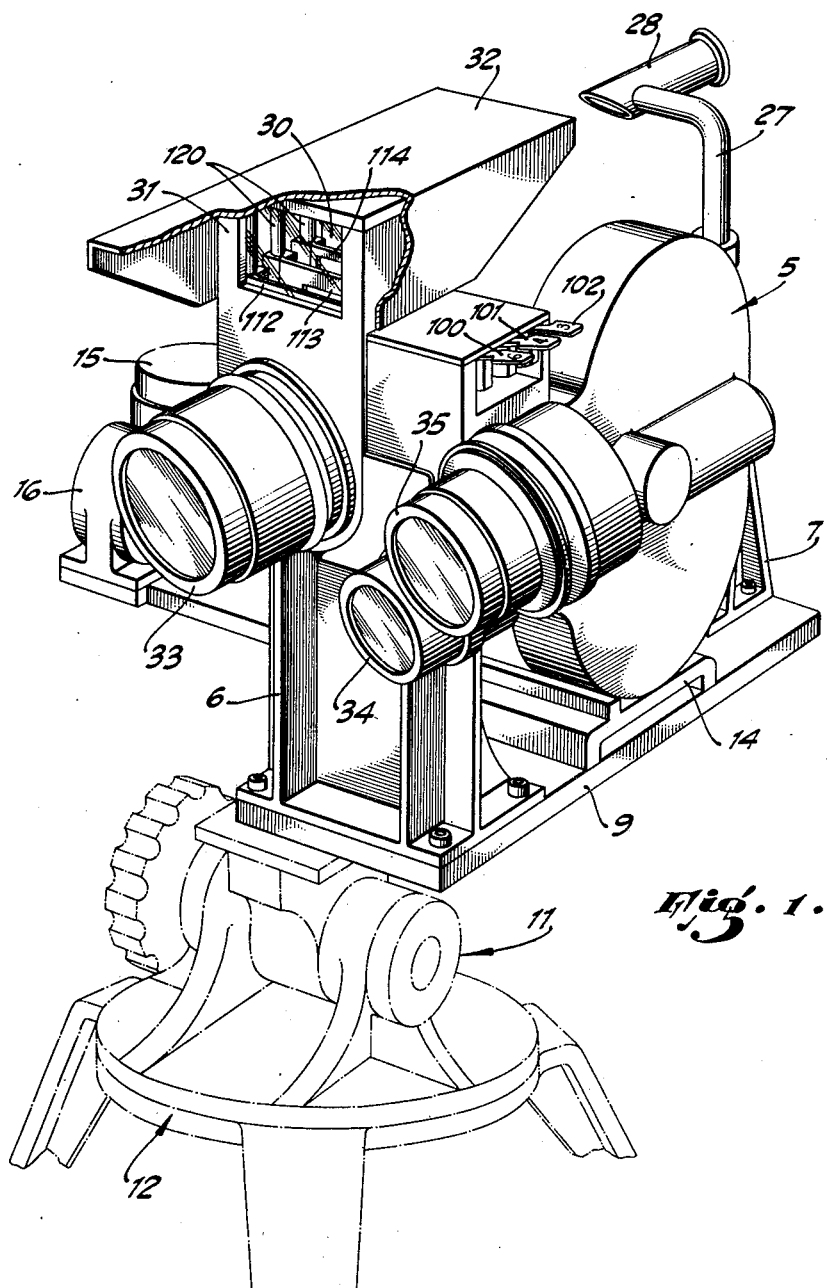
Fig. 1 is a perspective view of the invention shown in association with a standard type of 16 mm. motion picture camera.

Referring now to the drawings, in which the same numerals identify like elements, a well-known standard commercial type of 16 mm. camera 5 is shown mounted on a front, vertical bracket 6 and a rear, vertical V bracket 7, these brackets being mounted on a horizontal base plate 9, which may be attached to the universal mount 11 of a tripod 12, the latter being shown in dotted lines, since any type of standard tripod may be used. A U-shaped cross member 14 supports the camera at one end thereof and has mounted on the other end a drive motor 15 and a reduction gear box 16. It is to be understood, however, that the camera may be driven by any type of motor arrangement or be cranked by hand.

Figure 2:
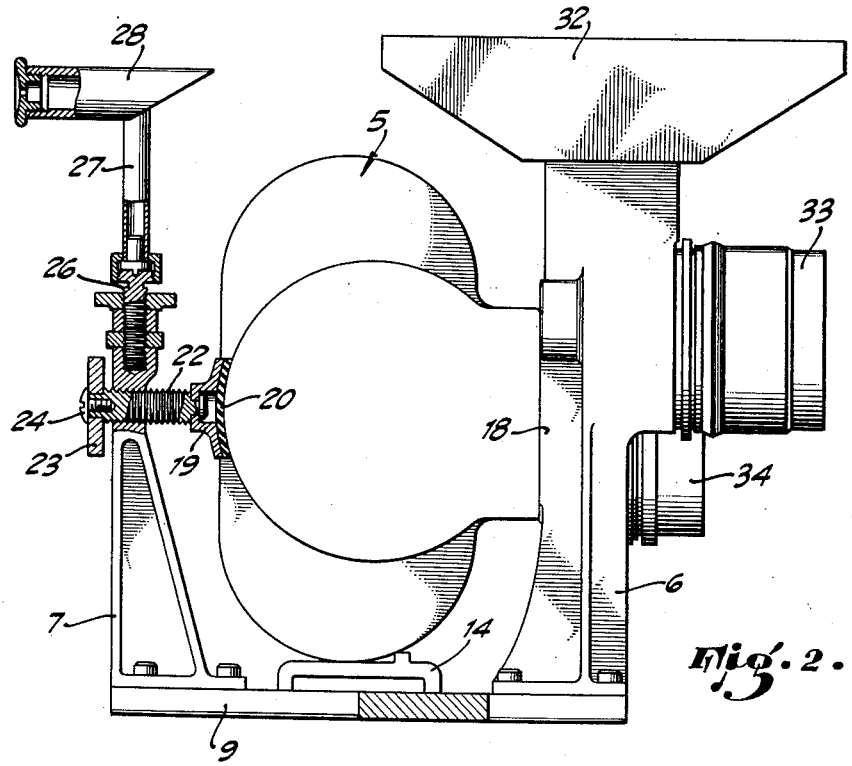
Fig. 2 is a side view showing the mounting arrangement for the camera.

As shown in Fig. 2, the camera rests on the frame member 14 and is firmly held between the plate 18 on the front frame 6 by a shoe 19 having a soft, protective facing 20 which may be of rubber, felt, or the like. A hand screw 22, rotatable in the shoe 19 and threaded through the frame 7, tightens the camera in position when rotated by hand wheel 23 attached to the screw 22 by a screw 24.

In the upper end of the frame 7, a screw 26 is threaded, to the head of which is attached tube 27 bent at right angles and supporting on its end an eye-pieice 28 of the view finder, adjustment as to elevation being accomplished by the screw 26. The front portion of the view finder consists of a window 30 in a housing 31, a trapezoidal sun shade 32 being provided, as shown in Figs. 1 and 2. The opening in the window 30 is varied in size by frames inserted therein, as will be explained hereinafter.

Referring now to the lens mount, three lenses 33, 34, and 35 are mounted 120° apart on the casting 31 in any suitable manner, such as by being threaded within an adapter sleeve 38, which is a slide fit in a threaded adjusting ring 40 retained on sleeve 38 by a retainer ring 41 pinned through sleeve 38 at a plurality of points, such as shown at 42 and 44. Pin 44 is a tongued pin with its end slidable in a groove 46 in a stationary ring 39 fitted into casting 31. The lenses may be easily removed for cleaning and repairing by unthreading from sleeve 38 and adjusted as to focus by the threads between stationary ring 39 and rotatable ring 40. The lenses may be a series of 3, 4, and 6 inch focal lengths, 4, 6, and 10 inch, or any other suitable series.

Figure 7:
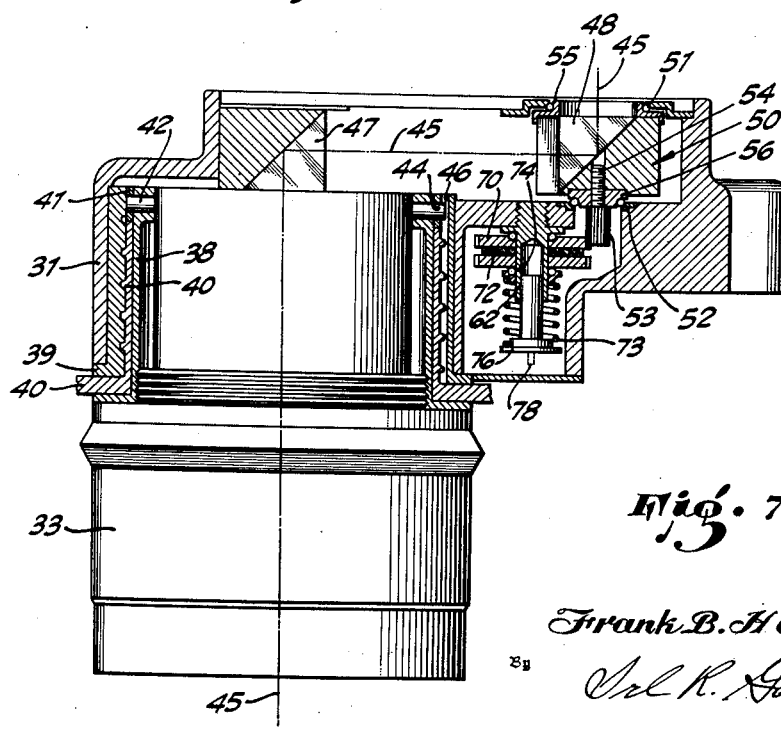
Fig. 7 is a cross-sectional view showing the optical path of the invention taken along the line 7—7 of Fig. 3.
Figure 8:
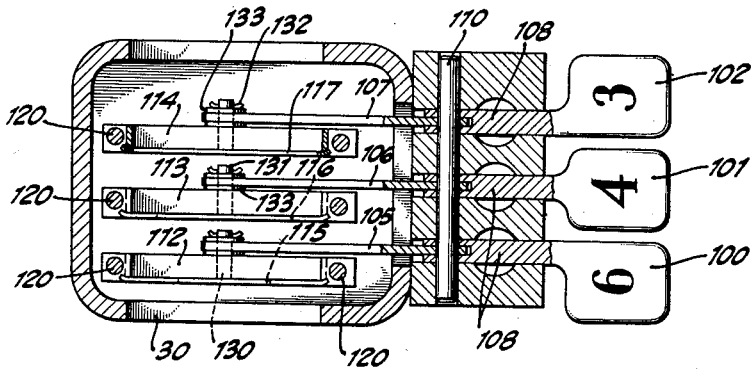
Fig. 8 is a plan view of the control levers of the invention taken along the line 8—8 of Fig. 3.
Figure 4:
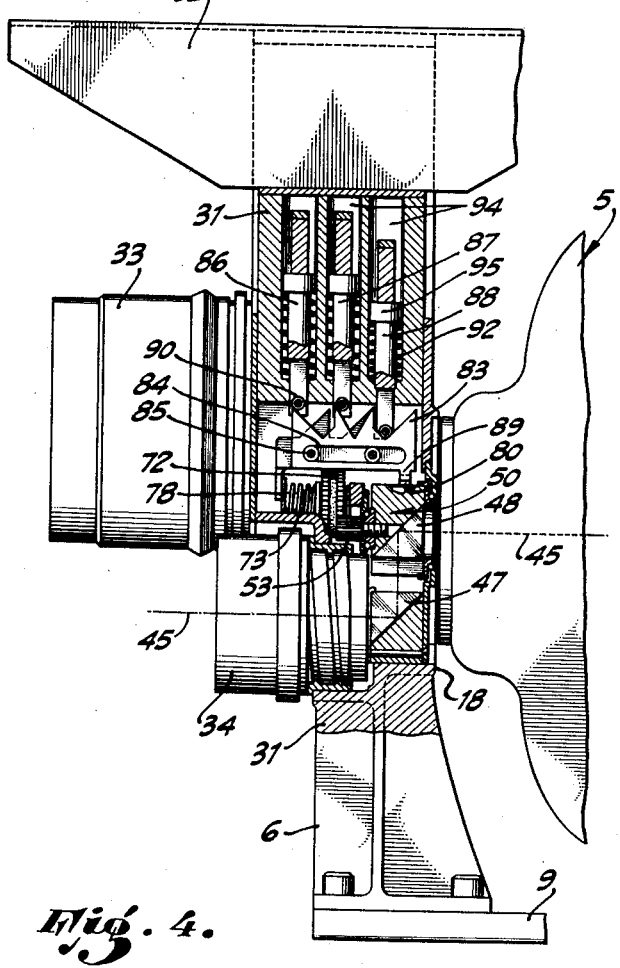
Fig. 4 is a cross-sectional, side view of the invention taken along the line 4—4 of Fig. 3.

As shown in Fig. 4, the optical axis of the camera is in its normal central position, and, as shown in this figure, lens 34 is being utilized, the central ray 45 being shown reflected by a stationary prism 47 and a rotatable prism 48 to the film in the camera. A similar view is shown enlarged in Fig. 7. Behind each of the lenses 33, 34, and 35, are fixed prisms, such as shown at 47, and which direct light at right angles to the optical axis of the camera. When the prism 48 is as shown in Figs. 4 and 7, an image of the scene through lens 34 is impressed on the film in the camera. When the prism 48 is rotated 120°, in a clockwise direction, light from lens 33 is projected to the film, lens 35 being utilized when the prism is rotated another 120°. If lens 35 is to be selected when lens 34 is in use, the prism is rotated 240°. Thus, instead of rotating the lenses 33, 34, and 35 with their mount, each lens may be brought into operation or operative position simply by rotating the prism 48 in its light weight mounting.

The mounting for prism 48 is a cylindrical block 50 having a notch cut therein with a 45° side on which the prism is placed. The end of block 50 has a stepped cap 55 which forms one race of a ball bearing 51, the cap being cut at the notch in the block and bent inwardly to hold the prism 48 in position and to provide a light opening to the camera. The other end of the block has a plate 56 mounted therein to form one race of a second ball bearing 52 for the block 50. A shaft 54 is threaded into the block 50 and has a pinion 53 fixedly mounted thereon. Thus, the prism unit has very small inertia and is substantially frictionless in its bearings, the optical center of the prism aligning with the axis of rotation of the block 50.

The mechanism for rotating the prism 48 will now be described, reference being made to Figs. 3–9, inclusive. As shown in Fig. 5, the end of the camera drive shaft is shown at 57, this shaft driving a shaft 58 through a key and slot connection 59. The end of shaft 58 has a pinion 60 mounted thereon which is in mesh with a gear 61 rotatable on a stub shaft 62 threaded in the casting 31. To insure the interconnection of the shafts 57 and 58 in case the key and slot do not properly align when the camera is placed in position, a spring pressed T pin 63 is provided between which and the side of the pinion 60 is a ball bearing 64. A compression spring 66 abuts the base of a tube 67 attached to a front plate 68 by a screw 69, and the head of the pin 63, which telescopes in the tube 67. Thus, since the shaft 58 is movable longitudinally, it may be moved against the compression of spring 66, in the event the key and slot do not coincide when the camera is mounted. However, when the shaft 57 starts rotating, the connection will be made and will be maintained by the spring 66.

Also mounted on the stub shaft 62 is a second gear 70 in mesh with the pinion 53 attached to the prism block 50. Between the gears 61 and 70, is a friction disc 72, the amount of torque being applied to the pinion 53 being determined by the tension in a coil spring 73 having one end pressing on the gear 61 through a bearing 74, and the other end pressing against the head of a pin 76 telescoping within the hollow stub shaft 62. The amount of tension in the spring 73 is determined by an arm 78 bearing against the head of pin 76.

Figure 9:
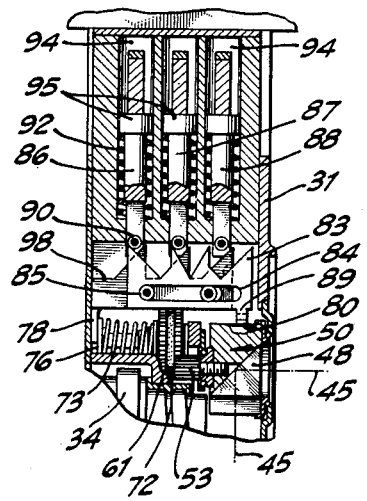
Fig. 9 is a cross-sectional view showing the rest position of the control plungers of the invention.

On the block 50 of the prism 48, are three radial projections, lugs, or stops 80, 81 and 82, disposed 120° apart and in different vertical planes. These projections are for the purpose of stopping the prism 48 at positions to reflect the images from the respective three lenses. The prism is stopped when any one of the projections comes in contact with an extension 89 on a sawtooth plate 83 longitudinally slideable on pins 85 in an elongated slot 84. The plate 83 is moved longitudinally to three different positions by the lowering of three rods or pins 86, 87, and 88 which have roller contact elements 90 thereon at their bottom ends. That is, when pin 88 is depressed, as shown in Fig. 4, the plate 83 is positioned to its extreme right where the lower portion of the right-hand notch is in axial alignment with the rod 88. When rod 87 is depressed, the plate 83 takes an intermediate position, while, when rod 86 is depressed, the plate 83 takes an extreme left-hand position. Normally, the rods 86, 87, and 88 are as shown in Fig. 9, respective compression springs, such as shown at 92, between the bottom of the spring and rod holes 94 and the collars 95 of the rods urging the rods upwardly until their upper ends contact the rest positions of the control levers. Thus, to position the extension 89 to contact any of the lugs 80, 81, and 82, the respective positioning rod is depressed.

In a plane parallel and adjacent to, but separated by a thin shim 91 from plate 83, is a second plate 98 which has regular saw-tooth notches which are adapted at all times to move the plate to the right, as shown in Figs. 4 and 9. The plate 98 has the right angle depending end 78 which bears against the head of pin 76. Thus, when any of the rods 86, 87, or 88 are depressed, not only is the plate 83 shifted in accordance with the rod depressed, but in each instance, the plate 98 is moved to the right, increasing the tension on spring 73, and, consequently, the friction between the disc 72 and the gears 61 and 70. This action shifts the extension 89 to the position to contact the proper one of lugs 80, 81, or 82 for the lens selected, and, at the same time, increases the driving torque so that the lens 48 is rapidly rotated 120° or 240° according to the lens selected. During the use of any particular lens, prism 48 is held firmly in position by the pressure of the lug against the extension 89 obtained by a predetermined amount of tension in the spring 73. This prevents any chattering or shifting of the lens during operation of the camera. Thus, by simultaneously selecting a lens and increasing the driving torque on the prism, the shift is made immediately upon the release of the block 50 by the extension 89, the rapidity of the shift not depending upon the rapidity of the movement of the control rod.

To select any one of the control rods 86, 87, and 88, a plurality of finger levers 100, 101, and 102 are provided, these levers being attached to respective crank arms 105, 106, and 107. The levers have depending cams such as shown at 108, the cams being notched to accommodate and bear against one end of the crank arms 105, 106, and 107. The levers and crank arms are all pivoted on a shaft 110. When a certain lever is depressed, its depending cam depresses the rod with which it is in contact to select the stop position of rotation of prism 48 and increase the driving torque on the prism as mentioned above. Simultaneously, the short end of the selected crank arm is moved forward by the cam, the long end thus raising one of a plurality of frames 112, 113, and 114, all of which have different sized openings such as shown at 115, 116, and 117, respectively, these frames being slidable on respective vertical shafts 120. The ends of arms 105, 106, and 107 are attached to the frames by pivot pins 130, 131, and 132 with appropriate washers such as shown at 133. Thus, whenever one of levers 100, 101, or 102 is depressed to select a lens of a certain focal length, there is simultaneously provided in the opening 30 a frame having an opening corresponding to the field of the selected lens. Each frame is held in raised operative position by a clip spring 122, which bears against the under side of the upper mounting ear 123 of the frame. When another frame is raised to position it in the window 30, the end of spring 122 is removed from under the ear 123 by the passage of the ear of the next selected frame against the lower portion of the spring, thus permitting the previously selected frame to be pulled to its inoperative position by gravity and a tension spring such as shown at 125 attached to the long end of the crank arms and screws in the casting 31 such as shown at 126. By having the crank arms separately pivoted on shaft 110, each lever may return to its horizontal or rest position while its respective crank arm remains with its frame. If the frame is down, however, the arm will be raised upon actuation of its lever.

There has thus been provided an adjunct for a 16 mm. camera which permits the photographing in correct focus of objects approaching or going away from the camera, the change from one lens to another being at such a rapid rate that perfect continuity of the action in the scene is obtained. Not only is the lens changed, but the proper field of view for the finder is simultaneously provided. Although the invention has been described in association with a certain type of standard 16 mm. camera, it is to be understood that it is also adaptable to other 16 mm. cameras or to 35 mm. cameras by varying the camera supporting mount. Furthermore, the power for driving shaft 58 may be supplied independently of the camera drive or the camera power obtained separately or through the shaft 58.

I claim:

1. An adjunct for a motion picture camera for maintaining a moving scene in focus on a film, said adjunct comprising a plurality of lenses of different focal lengths and having their axes substantially parallel to the optical axis of said camera and angularly disposed therefrom, light reflecting means for shifting any one of said optical axes to a position coincident with the optical axis of said camera, said means including a light deflector positioned on the optical axis of said camera, means for rotating said deflector to receive light from any selected one of the optical axes of said lenses, means for applying power from said rotating means for holding said deflector in any shifted position, means for selecting the position to which said deflector is to be shifted and simultaneously increasing the rotating power from said rotating means for rotating said deflector, said means for rotating said deflector including a clutch, spring means for providing a predetermined friction in said clutch, and means for tightening said clutch for rotation of said deflector.

2. A motion picture camera adjunct comprising a casting adapted to have a camera attached thereto, a plurality of lenses fixedly mounted on said casting for impressing images on a film in said camera, fixed reflectors for shifting the optical axes of said lenses to a common point, a light deflector mounted at said common point to align the optical axes of said lenses with the optical axis of said camera at mutually exclusive intervals, drive means, means for applying power to said light deflector for holding said deflector in a certain position, means for increasing the application of said power of said drive means to said deflector for shifting said deflector to select any one of the optical axes of said lenses, manual means for controlling the increase of power to said deflector and the selection of the lens optical axis for alignment with the optical axis of said camera, and a fixed resilient means for controlling the application of the holding power for said deflector.

3. A motion picture camera adjunct comprising a casting adapted to have a camera attached thereto, a plurality of lenses fixedly mounted on said casting for impressing images on a film in said camera, fixed reflectors for shifting the optical axes of said lenses to a common point, a light deflector mounted at said common point to align the optical axes of said lenses with the optical axis of said camera at mutually exclusive intervals, drive means, means for applying power to said light deflector for holding said deflector in a certain position, means for increasing the application of said power of said drive means to said deflector for shifting said deflector to select any one of the optical axes of said lenses, manual means for controlling the increase of power to said deflector and the selection of the lens optical axis for alignment with the optical axis of said camera, a fixed resilient means for controlling the application of the holding power for said deflector, a plurality of variable viewing frames corresponding to said plurality of lenses, and means connected to said manual means for simultaneously selecting the viewing frame appropriate for the lens selected.

4. A motion picture camera adjunct comprising a casting adapted to have a camera attached thereto, a plurality of lenses fixedly mounted on said casting for impressing images on a film in said camera, fixed reflectors for shifting the optical axes of said lenses to a common point, a light deflector mounted at said common point to align the optical axes of said lenses with the optical axis of said camera at mutually exclusive intervals, drive means, means for applying power to said light deflector for holding said deflector in a certain position, means for increasing the application of said power of said drive means to said deflector for shifting said deflector to select any one of the optical axes of said lenses, manual means for controlling the increase of power to said deflector and the selection of the lens optical axis for alignment with the optical axis of said camera, a fixed resilient means for controlling the application of the holding power for said deflector, a plurality of variable viewing frames corresponding to said plurality of lenses, means connected to said manual means for simultaneously selecting the viewing frame appropriate for the lens selected, and means for attaching said drive means to said camera, said manual means including a plurality of levers for releasing said deflector, selecting the stop position of said deflector, applying power for rotating said deflector, and selecting the viewing frame appropriate for the lens selected by said levers.

5. A rapid change optical path adjunct for a camera comprising a casting, a plurality of lenses spaced around said camera optical axis and having optical axes substantially parallel to said camera optical axis, a light reflector in the path of and fixed with respect to each of said lenses for shifting the optical axes of said lenses to a common point, a rotatable light deflector at said common point for deflecting light at mutually exclusive times from any one of the optical axes of said lenses, a rotatable mount for said deflector, gear drive means for said rotatable light deflector, a portion of said gear means being adapted to rotate continuously for holding said deflector in any one of several positions, a clutch plate contacting said continuously rotating portion of said gear means and the remaining portion of said gear means, means for determining respective stop positions of said rotatable deflector for selecting said optical axes of said lenses, said rotating gear portion urging the rotation of said deflector through said clutch plate, means for releasing said rotatable deflector for rotation to one of said stop positions, and means for simultaneously tightening said clutch during actuation of said releasing means.

6. An adjunct in accordance with claim 5, in which said stopping and releasing means includes a movable member having a projection therefrom, a plurality of lugs extending from said mount for said rotatable deflector, said lugs being disposed around said mount in different planes perpendicular to the axis of rotation of said deflector, a plurality of rods contacting said movable member for shifting said member and said projection from one of said lugs to a position to contact another of said lugs, said last mentioned means including a spring bearing against said clutch plate for predetermining the holding force on said deflector, and a second member contacted and movable by said rods for increasing the tension in said spring for tightening said clutch when said deflector is released for rotation.

7. An adjunct in accordance with claim 6, in which said members are saw-toothed plates, said first plate having notches adapted to move said plate to three different positions by the insertion of respective rods in respective notches, said second plate having notches of uniform shape for shifting said plate in the same direction for tightening said clutch.

8. An adjunct in accordance with claim 7, in which a plurality of substantially horizontal levers corresponding in number to said rods are in contact with the ends of said rods, manual operation of said levers actuating said rods.

9. An adjunct in accordance with claim 5, in which a view finder is provided, said view finder having different sized frames corresponding to the focal lengths of said lenses, together with means for positioning a certain frame in operative position when a respective lens is selected, said last mentioned means including hand operated levers contacting said deflector releasing means and said frames.

10. An optical unit having a plurality of optical paths for forming images on a surface, said unit comprising a rotatable light deflector for selecting any one of said paths for impressing a certain image on said surface, means for continuously applying power for holding said deflector in a certain position, means for releasing said deflector for rotation, means for increasing the application of power to said deflector when released for rotation, means on said deflector for determining a plurality of stop positions for said deflector corresponding to said plurality of paths, and means for simultaneously selecting the stop position of said deflector when said deflector is released.

11. An optical unit in accordance with claim 10, in which said rotatable light deflector is a prism, said holding means including gear means for rotating said prism to intercept any selected one of said optical paths, and said means for increasing the application of power including a slipping clutch of two portions interposed between said gear means, one portion of said clutch being continuously driven, and resilient means acting on said continuously driven portion.

12. An adjunct for a motion picture camera for maintaining a moving scene in focus on a film, said adjunct comprising a plurality of lenses of different focal lengths and having their axes substantially parallel to the optical axis of said camera and angularly disposed therefrom, light reflecting means for shifting any one of said optical axes to a position coincident with the optical axis of said camera, said means including a light deflector positioned on the optical axis of said camera, means for rotating said deflector to receive light from any selected one of the optical axes of said lenses, means for applying power from said rotating means during the advancement of said film for holding said reflecting means in any shifted position, means on said reflecting means for determining the stopping position thereof for receiving light from each of said lenses of different focal lengths, and means for selecting the stopping position to which said deflector is to be shifted and simultaneously increasing the rotating power from said rotating means for rotating said deflector.

13. An adjunct in accordance with claim 12, in which said deflector position selecting means includes means for selecting the field of said scene simultaneously with the selection of the respective lens.

14. A motion picture camera adjunct comprising a casting adapted to have a camera attached thereto, a plurality of lenses fixedly mounted on said casting for impressing images on a film in said camera, fixed reflectors for shifting the optical axes of said lenses to a common point, a light deflector mounted at said common point to align the optical axes of said lenses with the optical axis of said camera at mutually exclusive intervals, means on said deflector to determine the stopping position thereof to select any one of said fixed optical axes, drive means for said film, means for applying power to said light deflector for holding said deflector in a certain position, and means for increasing the application of said power to said deflector for shifting said deflector and simultaneously select any one of said stopping means.

15. A mechanism for selecting different focal length lenses for photographing a scene on a film, comprising a shaft adapted to be continuously rotated during advancement of said film, a gear rotated by said shaft, a second gear, a clutch plate between said gears, resilient means bearing against one of said gears for providing a predetermined friction between said clutch plate and said gears at all times, a light deflecting element geared to said second gear and rotated by said second gear when said second gear rotates, the particular position of said element selecting one of said lenses for impressing light on said film through one of said selected lenses, said friction between said clutch plate and gears holding said element in fixed position, and manually operable means for increasing the tension in said resilient means for increasing the friction between said clutch plate and said gears, said last mentioned means including means for releasing said optical element and for selecting the stop position of said element when moved by the rotation of said second gear.

16. A mechanism in accordance with claim 15, in which said light deflecting element has extensions therefrom and said manually operable means includes an adjustable element movable to positions to contact one of said extensions.

17. A mechanism in accordance with claim 15, in which a view finder is provided, said finder having frames varying in size in accordance with the focal lengths of said lenses, and manually operable levers for shifting the position of each of said frames to operative position, said lever contacting said releasing means for said optical element.

FRANK B. HUNTER.

REFERENCES CITED

The following references are of record in the file of this patent:

UNITED STATES PATENTS

| Number | Name | Date |
| --- | --- | --- |
| 1,494,801 | Pittman | May 20, 1924 |
| 1,795,626 | Watkins | Mar. 10, 1931 |
| 1,846,571 | Rochestie et al. | Feb. 23, 1932 |
| 2,083,646 | Fuller | June 15, 1937 |
| 2,242,666 | Walsh | May 20, 1941 |

FOREIGN PATENTS

| Number | Country | Date |
| --- | --- | --- |
| 624,467 | Germany | Jan. 21, 1936 |